March 25, 1958 W. J. CASEY III, ET AL 2,827,986
ROTOR BRAKE
Filed June 5, 1953
2 Sheets-Sheet 1
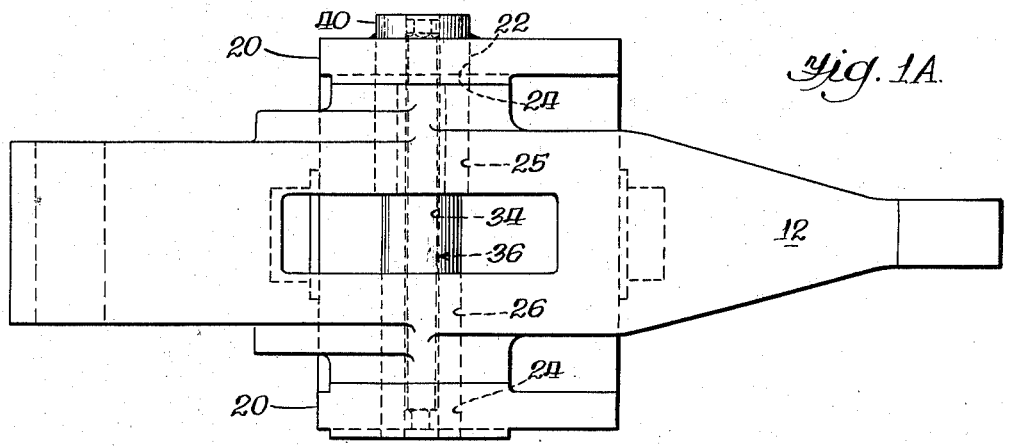
Fig. 1A.
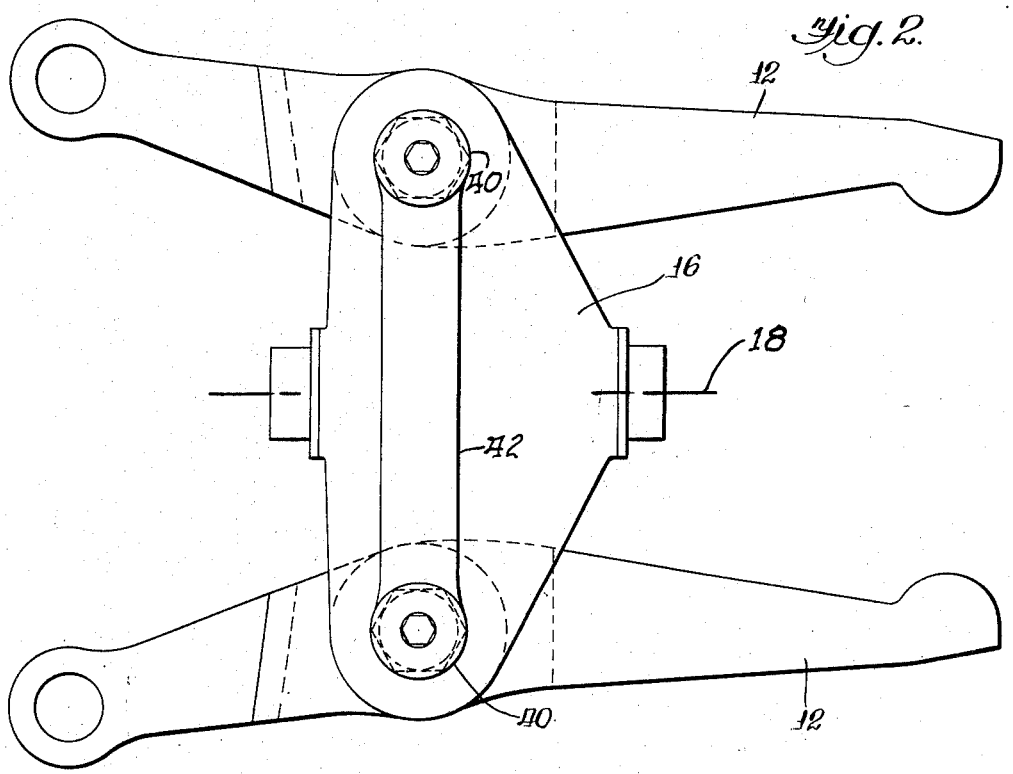
Fig. 2.
Fig. 1.
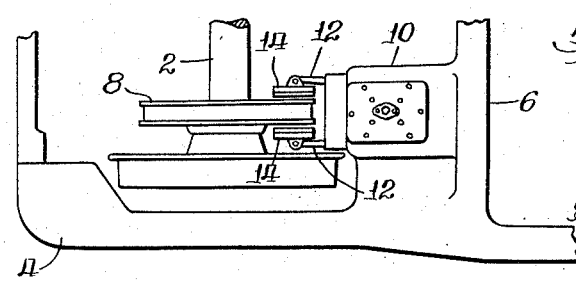
INVENTORS.
William J. Casey, III
Mehmet Kemal Coskun
By
Atty.

March 25, 1958     W. J. CASEY III, ET AL     2,827,986
ROTOR BRAKE
Filed June 5, 1953     2 Sheets-Sheet 2
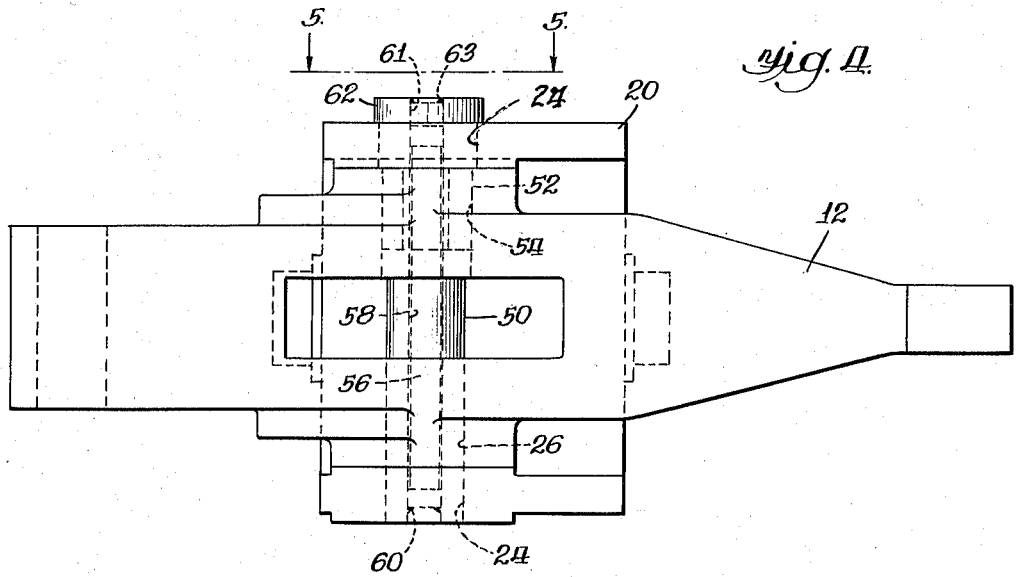
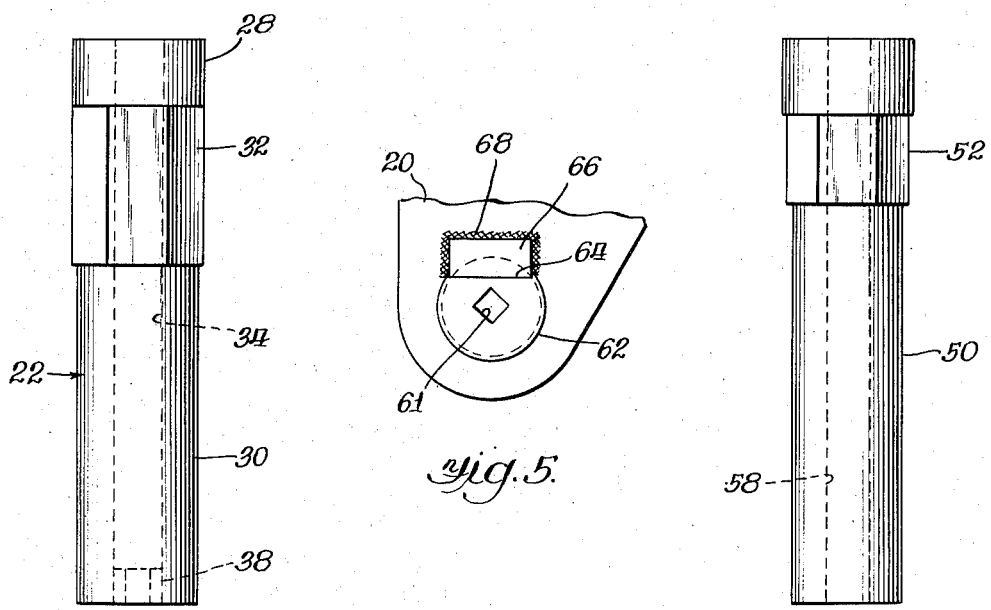
INVENTORS.
William J. Casey, III
Mehmet Kemal Coskun 2,827,986
Patented Mar. 25, 1958

2,827,986
ROTOR BRAKE

William J. Casey III and Mehmet K. Coskun, Granite City, Ill., assignors to American Steel Foundries, Chicago, Ill., a corporation of New Jersey Application June 5, 1953, Serial No. 359,748

10 Claims. (Cl. 188—216)

The invention relates to railway brake equipment and more particularly a novel releasing means.

It is a primary object of the invention to provide a novel releasing mechanism for a railway brake arrangement. It is a further object of the invention to provide a releasing mechanism for a rotor brake wherein individual release springs actuate each brake lever.

It is a further and more specific object of the invention to provide a spring torsion bar operative to release a brake lever and carried shoe from engagement with the associated friction surface.

It is a further object of the invention to provide a novel pivotal mounting for a brake lever in the brake of the type described, said pivotal mounting incorporating a torsion bar release spring operative to resiliently bias the lever from engagement with the associated friction surface.

These and other objects of the invention will become apparent from an examination of the concerned drawings and the descriptive material associated herewith.

In the drawings:

Figure 1 is a fragmentary partially diagrammatic plan view of a railway truck incorporating a conventional type brake equipment to which the invention may be adapted;

Figure 1A is a fragmentary side elevational view of one of the brake levers and mounting therefor utilized in the brake housing in Figure 1;

Figure 2 is a fragmentary plan view of the structure shown in Figure 1;

Figure 3 is a detailed drawing of the pivot pin utilized in the embodiment of Figures 1A and 2;

Figure 4 is a side elevational view, similar to the view of Figure 1A but showing a different embodiment of the invention;

Figure 5 is a fragmentary partial view taken along lines 5—5 of Figure 4, and

Figure 6 is a detailed view of the pivotal pin employed in the embodiment illustrated in Figures 4 and 5.

Describing the invention in detail and referring first to Figure 1, it will be seen that the railway truck comprises a wheel and axle assembly 2 supporting in the usual manner (not shown) a frame 4, said frame 4 comprising a transverse member 6. A rotor 8 is fixedly secured to the assembly and rotatable therewith. A brake housing 10 is conventionally mounted on the transverse member 6, said brake housing comprising a pair of brake levers 12, 12 extending from one side thereof toward and embracing the rotor 8 of the wheel and axle assembly. On the outward extremities of each brake lever 12 there is positioned a brake head assembly 14, each assembly comprising a pivotally mounted brake head and a shoe carried by said brake head on the side thereof adjacent the rotor, said shoe being engageable with the associated rotor surface upon actuation of the related brake lever 12. A conventional fluid operated cylinder (not shown) is provided within the housing to actuate the brake levers.

Attention is now directed to Figures 1A and 2, wherein is fragmentarily illustrated the internal pivotal mounting of the brake levers 12, 12 in the housing 10. In said figures it will be seen that the internal portion of the housing comprises a mounting block 16, said mounting block being pivoted to the housing on a horizontal axis 18 extending generally longitudinally of the truck. On opposite sides of the axis 18, the mounting block presents vertically spaced horizontally disposed wings 20, 20. Each brake lever 12 is received intermediate the wings 20, 20 of mounting block 16 and pivotal connection is made between the brake lever and the mounting block by means of a pin 22, said pin being received within aligned apertures 24, 24 and 25, 26 formed in the wings 20, 20 of the mounting block and in the brake lever 12 respectively.

Referring now to Figure 3 wherein is illustrated in detail the construction of the pin 22 employed in the embodiment of Figures 1A and 2, it will be seen that the upper portion 28 of the pin 22 is of generally cylindrical form as is the lower portion 30. Intermediate said upper and lower portions a polygonal segment 32, preferably hexagonal, is formed on said pin. The upper cylindrical portion 28 is received within the cylindrical aperture 24 of the upper wing 20 of the mounting block, while the lower cylindrical portion 30 is received within the cylindrical aperture 24 of the lower wing 20 of the mounting block and an additional portion thereof is received within the lower cylindrical aperture 26 of the brake lever 12. The polygonal portion 32 of the pin 22 is received within a polygonal aperture 25 formed in the upper part of the brake lever 12. The interengagement between the polygonal form 32 and the polygonal form 25 causes the brake lever to be nonrotatably fixed to the pin 22 whereby the pin will rotate with the lever. Thus it will be seen that the pin 22 is generally pivoted within the wings 20 of the block 16 and rotates concurrently with the brake lever 12 during movement of the latter.

Additionally, the pin 22 presents a longitudinal and centrally located aperture 34, said aperture 34 receiving therein a torsion spring bar indicated generally at 36. The lower extremity of the aperture 34 of the pin 22 is of polygonal form as at 38 and receives a complementally formed end portion of the torsion bar 36. As noted the torsion bar 36 is disposed within the aperture 34, and, as will be readily seen in Figure 1A, the upper end of the bar extends outwardly of said aperture to a point above the wing 20 of the mounting block 16. This upper extremity of the torsion bar 36 is of polygon form and is received within a complemental aperture formed centrally within the boss 40 of the locking bar or arm 42. As will be noted by reference to Figure 2, the locking bar 42 presents a pair of bosses 40 on its opposite ends, each boss 40 receiving an end of the associated torsion bar 36 of the respective brake levers 12. The locking bar may be tack welded in position on the mounting block 16.

Thus it will be seen that each pivotally movable brake lever is fixedly secured to the related pivotal pin 22 causing the pin to move therewith upon actuation of the lever. The pin 22 has one end thereof fixedly secured to one end of the torsion bar 36, the other end of the torsion bar being secured against rotation by the locking bar 42. Thus upon actuation of the brake levers 12 and pivotal movement of the pins 22 a torsional stress is introduced primarily into the torsion bars 36, said torsional stress serving to resiliently return the associated brake levers 12 to the release position upon dissipation of the actuating pressure on the brake levers 12. It should be noted that each brake lever 12 is secured to the associated pivotal pin 22 on an end thereof opposite from the connection of the pivotal pin to the torsion bar 36. This construction enables the torsional deformation of the pivotal pin 22 itself to be utilized to complement the torsional action of the torsion bar 36.

Attention is now directed to an alternate embodiment illustrated in Figures 4 through 6. In the embodiment of Figures 4 through 6 the brake lever and brake lever mounting construction is substantially identical to that described in the earlier embodiment, there being, however, certain detail differences in the mounting of the torsion spring bar. A pivotal pin 50 is employed in this embodiment to pivotally connect the brake lever 12 to the wings 20 of the mounting block 16. The pin is pivotally received within apertures 24, 24 of the wings 20 and pivotally received within aperture 26 of the lower segment of the lever 12 and nonrotatably fixed to the brake lever by means of the polygonal section 52 received within a polygonal aperture 54 of the upper portion of the brake lever 12. The lower apertures 24 and 26 may be bushed to receive the lower cylindrical pin portion. A torsion bar 56 is disposed within a longitudinal aperture 58 of the pin 50, the lower end of the torsion bar being fixedly secured to the lower end of the pin 50 by any suitable means, for example, as by welding at 60. The upper end of the torsion bar 56 extends outwardly from the upper extremity of the pin 50 and above the upper face of the upper wing 20 of the mounting block 16. A polygonal section is again formed on the upper extremity of the torsion bar 56, said polygonal extension being received within an aperture 61 of complementary polygonal form within a torque washer 62. The torsion bar may be tack welded to the washer as at 63. The torque washer 62 has a flat 64 formed on one side thereof (Figure 5), said flat abutting a stop lug 66 which is fixedly secured to the upper surface of the wing 20 by any suitable means, for example, by welding as at 68. It should be readily appreciated that the stop lug and its abutting engagement with the flat 64 of the torque washer 62 fixedly secures the upper end of the torsion bar 56 against rotation.

Operation of the embodiment of Figures 4 through 6 is identical with that as described relative to the embodiment of Figures 1A through 3, hence need not be repeated again.

Thus it will be seen that the invention provides a novel brake lever release actuating mechanism wherein a single spring is connected to each lever to individually operate said lever, said spring employing the resilient deformable characteristics of a torsion bar to supply the required releasing energy.

We claim:

1. In a brake arrangement for a railway car truck, a wheel and axle assembly, a frame supported therefrom, a rotor secured to the assembly and rotatable therewith, a brake housing supported from the frame, said housing comprising a mounting block pivoted therewithin on an axis extending longitudinally of the truck, actuable brake levers pivotally carried by the block at points at opposite sides of said axis, pins presenting apertures longitudinal thereof, said pins being operatively connected to said brake levers and said mounting block, shoes carried by said levers and engageable with opposite sides of the rotor, spring means associated with each lever operative to return said lever to released position, each of said spring means comprising a resilient torsion bar, said torsion bar being inserted in said apertures, said torsion bar being operatively connected to said mounting block.

2. A brake arrangement for a railway car truck according to claim 1, wherein each torsion bar has its opposite ends operatively secured to the housing and levers, respectively.

3. In combination with a rotor brake arrangement for a railway car truck, a brake lever carrying a shoe engageable with the rotor, a mounting block, a pivotal connection between the mounting block and lever comprising a pin having a longitudinal hole therethrough, said pin being received within aligned apertures in the block and lever, said pin being pivotally movable in said block and being fixed to the lever, a torsion bar received within said longitudinal hole in said pin, said bar having one of its ends connected to the pin and the other of its ends secured against rotation relative to the pin.

4. The combination of claim 3, wherein the other end of said bar is secured to said block.

5. In combination with a rotor brake arrangement for a railway car truck, a pair of brake levers carrying brake shoes engageable with opposite sides of the rotor, a mounting block, pivotal conections between the block and the levers, each connection comprising a pin having a longitudinal hole therethrough, said pin being received within aligned apertures within the block and lever, each pin being pivotally movable in said block and being fixed to the lever, a torsion bar received within said longitudinal opening in each pin, each bar having one of its ends connected to the pin and the other of its ends secured against rotation relative to the pin.

6. The combination of claim 5, wherein the other ends of said bars are secured to the block.

7. The combination of claim 5, wherein the other ends of said bars are secured to each other.

8. In combination with a rotor brake arrangement for a railway car truck, a pair of brake levers carrying brake shoes engageable with opposite sides of the rotor, a mounting block, pivotal connections between the block and the levers, said connections comprising hollow pins wherein said pins are pivotally movable in the block and are operatively connected to the levers, the connection between the pins and the levers being accomplished by polygonal holes in each lever receiving a complementally formed portion of each pin, and a torsion bar inserted in each of said hollow pins to operatively connect said pins and said mounting block.

9. In a brake arrangement for a railway car truck having a movable friction surface, a brake shoe movable into and out of engagement with said surface, a brake lever carrying the brake shoe, a pin pivotally connecting the lever to the truck, said pin being hollow and having a torsion spring bar disposed therein, one end of said bar being operatively connected to the lever and the other end of said bar being operatively connected to the truck.

10. A brake arrangement for a railway car truck according to claim 9, wherein said pin pivots in the frame and is relatively fixed to the lever, and the bar has one end thereof connected to the pin.

References Cited in the file of this patent

UNITED STATES PATENTS

| 1,322,215 | Young | Nov. 18, 1919 |
| 1,349,090 | Ohrt | Aug. 10, 1920 |
| 1,683,378 | Bendix | Sept. 4, 1928 |
| 1,872,872 | Bendix | Aug. 23, 1932 |
| 2,355,123 | Tack et al. | Aug. 8, 1944 |
| 2,360,307 | Tack et al. | Oct. 10, 1944 |
| 2,374,859 | Gaenssle | May 1, 1945 |
| 2,413,614 | Eksergian | Dec. 31, 1946 |
| 2,692,659 | Tack | Oct. 26, 1954 |